3,261,104
HEAT TREATMENT OF POLYVINYL ALCOHOL FILM

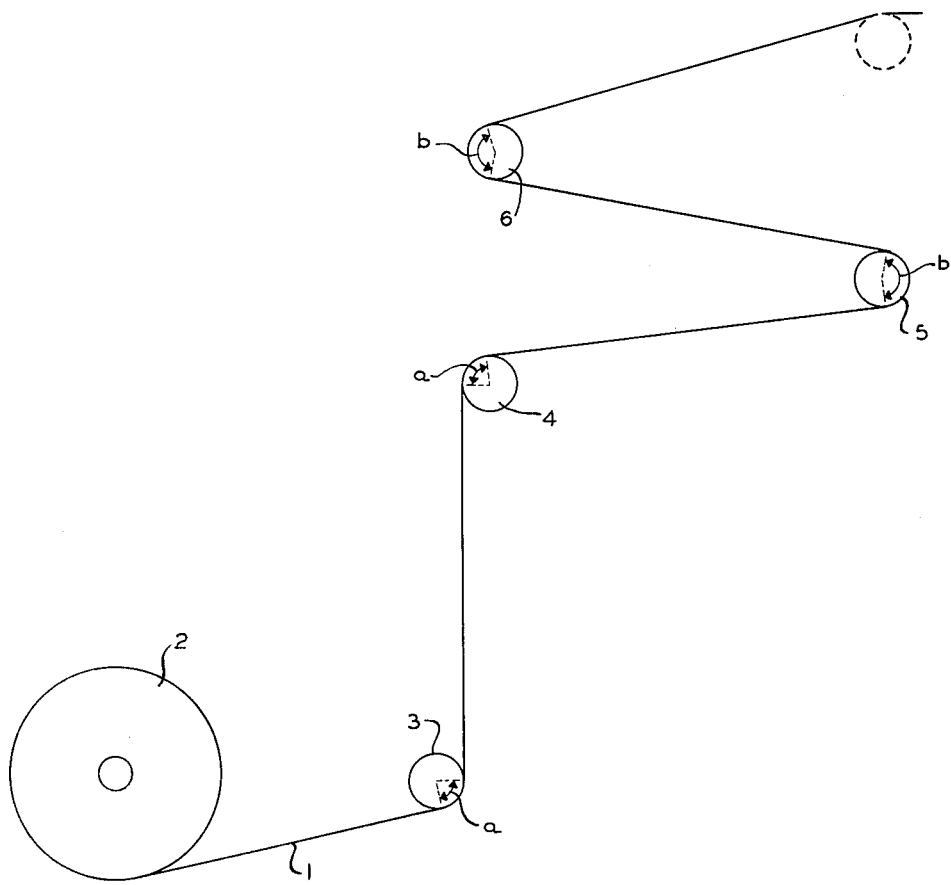

Seiichi Sakakibara, Kurashiki-shi, Okayama-ken, and Keisuke Nakahari, Nishinomiya-shi, Hyogo-ken, Japan, assignors to Kurashiki Rayon Co., Ltd., Kurashiki-shi, Okayama Prefecture, Japan, a corporation of Japan
Filed Dec. 4, 1962, Ser. No. 242,318
Claims priority, application Japan, Dec. 7, 1961, 36/44,507
4 Claims. (Cl. 34—12)

This invention relates to heat treatment of polyvinyl alcohol film.

Fabrication of polyvinyl alcohol film into finished products has required considerable care because polyvinyl alcohol film has high elongation and pliability. The elongation and flexibility of polyvinyl alcohol film are increased markedly as the moisture content of the film increases. Polyvinyl alcohol film absorbs moisture when exposed to a high humidity atmosphere, either in film treatment operations or when allowed to stand. The problem of moisture absorption is especially acute when the atmosphere has a high humidity for a prolonged period of time, as for example during the rainy seasons which occur in certain parts of the world. Polyvinyl alcohol which has absorbed considerable moisture is prone to crease lengthwise along its entire surface, due to its high elongation and flexibility. As a result, difficulties have been encountered in continuous processing of film into finished products.

One example of a fabrication operation which is adversely affected by high moisture content is bag making. In the making of bags from polyvinyl alcohol, it is customary to pass a continuous sheet or web of polyvinyl alcohol film continuously over a bending guide means in order to fold the film lengthwise. The bending guide means tends to cause elongation of the film, making it difficult to advance a film which has not been treated according to this invention evenly and smoothly along the bending guide means. Instead, the film picks up small creases which mar the appearance of the film and the bags produced therefrom. Furthermore, upon cutting of the bag, the film tends to be fused along the cut, and adjacent sheets or plies of film tend to adhere to each other.

Another fabrication operation in which conventional polyvinyl alcohol film having high moisture film content poses problems is in printing the surface of the film. Printed characters on such film tend to blur and to become indistinct because of uneven stretching of the film. This problem is particularly troublesome with three-color printing processes.

According to the present invention, polyvinyl alcohol film is heat treated immediately before fabrication into a finished product, in order to reduce the moisture content of the film to a desired level and to reduce the elongation and the flexibility of the film to values which are acceptable in fabrication operations. Generally, a moisture content in the film of 3 to 4 percent by weight after treatment is desired. This invention makes it possible to reduce the moisture content to that level from amounts as high as 10 percent by weight. As a result of such heat treatment, the film undergoes much less elongation and deformation in the manufacture of finished products than does film which is not so treated, with resulting increase in accuracy in dimensions of the finished product.

One embodiment for reducing the moisture content will now be described with reference to the accompanying drawings, in which the sole figure is a schematic diagram of the apparatus used.

According to this embodiment of the invention, a polyvinyl alcohol film is fed as a continuous sheet or web from a feed roll 2. The film passes successively over cylindrical hot rolls 3, 4, 5, and 6, and then passes directly from the last hot roll 6 to an operation (not shown) for fabrication of a finished product. The hot rolls may be heated by any conventional means such as steam or electrical resistance. It is important to maintain a uniform temperature over the entire surface of each hot roll. The surface area of contact between the film and the hot rolls is large enough to provide gradual heating of the film, and excessively high hot roll surface temperatures are avoided.

First hot roll 3 and second hot roll 4 contact opposite surfaces of film 1. Preferably, hot rolls 3 and 4 are maintained at the same temperature. The angles $a,a$ of contact between the film 1 and hot rolls 3 and 4 are preferably identical. By maintaining hot rolls 3 and 4 at the same temperature and by maintaining the angles of contact by these two hot rolls and the film identical, the film is heated uniformly on both sides.

After the film passes over hot roll 4, it passes to a second pair of hot rolls comprising third hot roll 5 and fourth hot roll 6. The temperature of each of these two hot rolls is preferably the same, and is higher than the temperature of rolls 3 and 4. The angles of contact $b,b$ between hot rolls 5 and 6 are preferably identical and are larger than the angles of contact $a,a$ between film 1 and rolls 3 and 4. In a typical embodiment, angles $a,a$ are not greater than 90° and angles $b,b$ are about 160°.

According to one specific embodiment of this invention, polyvinyl alcohol film is continuously passed as a continuous sheet or web at a speed of 30 meters per minute over the apparatus shown in the sole figure. The external surfaces of hot rolls 3 and 4 are maintained at a uniform temperature of 70° C., and the surfaces of hot rolls 5 and 6 are maintained at a uniform temperature of 80° C. Angles of contact $a,a$ are not more than 90°, and the angles $b,b$ are about or slightly less than 160° C. The film passes through the entire heat treatment zone in about 2 to 4 seconds. The initial moisture content of the film may be as high as 10 percent, and the final content of film leaving rolls 6 is about 3 to 4 percent.

While the use of hot rolls have been illustrated as a specific embodiment of the invention, the film may be heated by other methods which achieve the same degree of reduction of moisture content. For example, the film may be heated on both sides with infra-red ray lamps or from radiant heat of sheathed heaters. Regardless of the heat means employed, it is important to carry out the heat step immediately before fabrication into a finished product, so that the film will have the proper moisture content during manufacturing operations and will not have the opportunity to absorb moisture by prolonged exposure to a moist atmosphere. Heat treatment followed by immediate fabrication gives a film having sufficient hardness and sufficiently low elongation to go through fabrication operations without undesired creasing, deflection or elongation. Heat treatment according to this invention reduces the moisture content to the desired level and also smooths out any creases which may have developed in the film prior to treatment. Products made from film which has heat treatment according to this invention have smooth, wrinkle-free surfaces, and the difficulties heretofore inherent in continuous fabrication of film into finished product is avoided.

This invention has been described in detail with respect to specific embodiments, but it is understood that these are merely illustrative and not limiting. The scope of this invention shall be measured only by the appended claims.

We claim:

1. A process for fabricating products from polyvinyl alcohol film which comprises continuously and uniformly heating both sides of a relatively moist polyvinyl alcohol film in first and second heating zones to reduce the moisture content of said film taken from the second heating zone to about 3 to 4% by weight, the temperature in the second zone being maintained higher than that in the first zone, and immediately after withdrawing the film from said second zone fabricating said film into a folded or printed product.

2. A process according to claim 1 in which the heat treatment time is about 2 to 4 seconds.

3. A process for fabricating products from polyvinyl alcohol film which comprises continuously and uniformly heating both sides of a relatively moist polyvinyl alcohol film by continuously passing said film successively over first and second hot rolls, one side of said film contacting said first hot roll and the other side contacting said second hot roll, then passing said film successively over third and fourth hot rolls, one side of said film contacting said third hot roll and the other side contacting said fourth roll, said first and second hot rolls being maintained at a first predetermined temperature and said third and fourth rolls being maintained at a second predetermined temperature higher than said first predetermined temperature, continuously withdrawing from said fourth roll polyvinyl alcohol film reduced to a moisture content of about 3 to 4% by weight and immediately fabricating said film into a folded or printed product.

4. A process according to claim 3 in which said first and second hot rolls have a surface temperature of about 70° C. and said third and fourth hot rolls have a surface temperature of about 80° C.

References Cited by the Examiner

UNITED STATES PATENTS

| | | | |
|---|---|---|---|
| 2,239,718 | 4/1941 | Izard | 264—185 X |
| 2,603,838 | 7/1952 | Lowry | 18—48 |
| 2,812,550 | 11/1957 | Chavannes | 18—48 |
| 2,862,303 | 12/1958 | Craver | 34—113 X |
| 2,955,345 | 11/1960 | Howe. | |
| 3,061,884 | 11/1962 | Hirano et al. | 264—185 X |

WILLIAM F. O'DEA, *Primary Examiner.*

NORMAN YUDKOFF, *Examiner.*

ALDEN D. STEWART, J. SOFER, J. J. CAMBY,
*Assistant Examiners.*